Nov. 18, 1941.　　　　G. L. GARVIN　　　　2,263,438
BELT SHIFTER
Filed June 28, 1940　　　　4 Sheets-Sheet 1

INVENTOR.
GEORGE L. GARVIN
BY
Altsch & Knoblock
ATTORNEYS.

Nov. 18, 1941.  G. L. GARVIN  2,263,438
BELT SHIFTER
Filed June 28, 1940  4 Sheets-Sheet 2

INVENTOR.
GEORGE L. GARVIN
BY Oltsch & Knoblock
ATTORNEYS.

Nov. 18, 1941.    G. L. GARVIN    2,263,438
BELT SHIFTER
Filed June 28, 1940    4 Sheets-Sheet 3
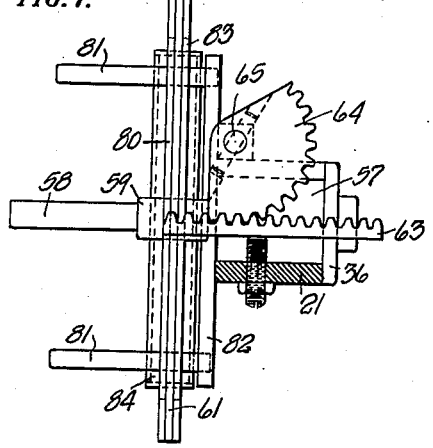
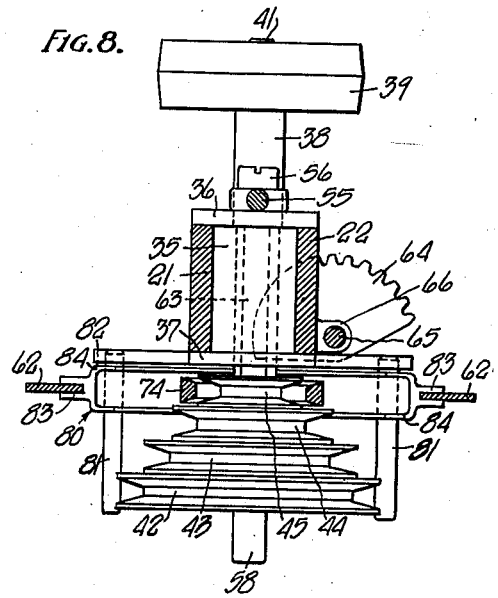
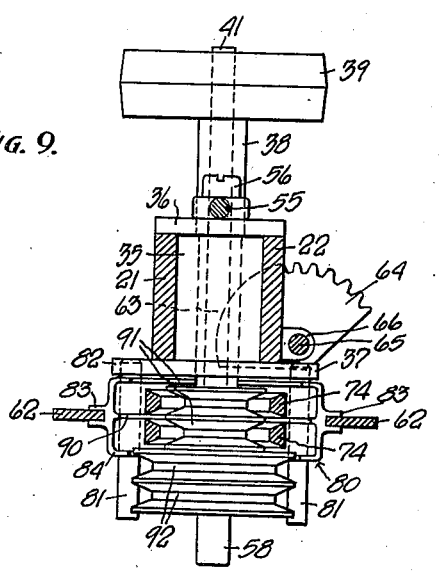
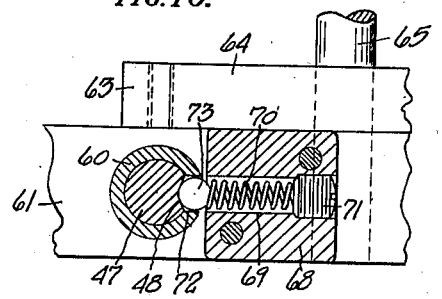
INVENTOR.
GEORGE L. GARVIN,
BY Oltsch & Knoblock
ATTORNEYS.

Nov. 18, 1941.  G. L. GARVIN  2,263,438
BELT SHIFTER
Filed June 28, 1940  4 Sheets-Sheet 4
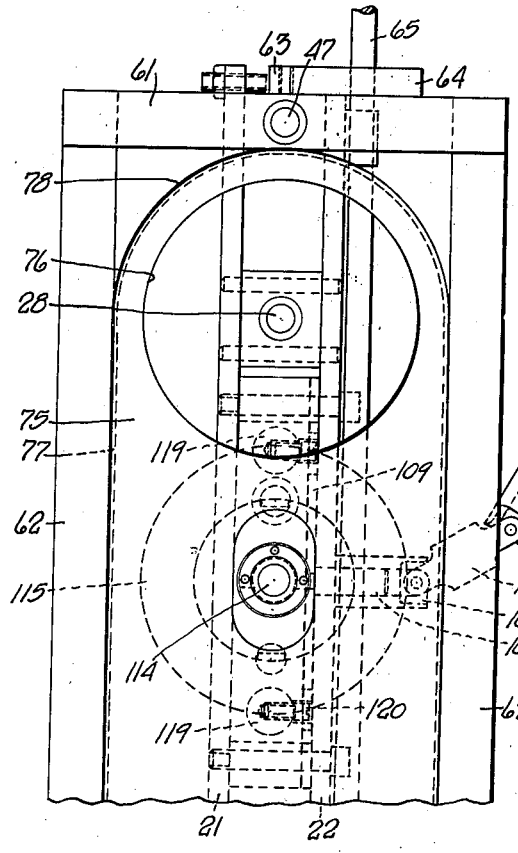
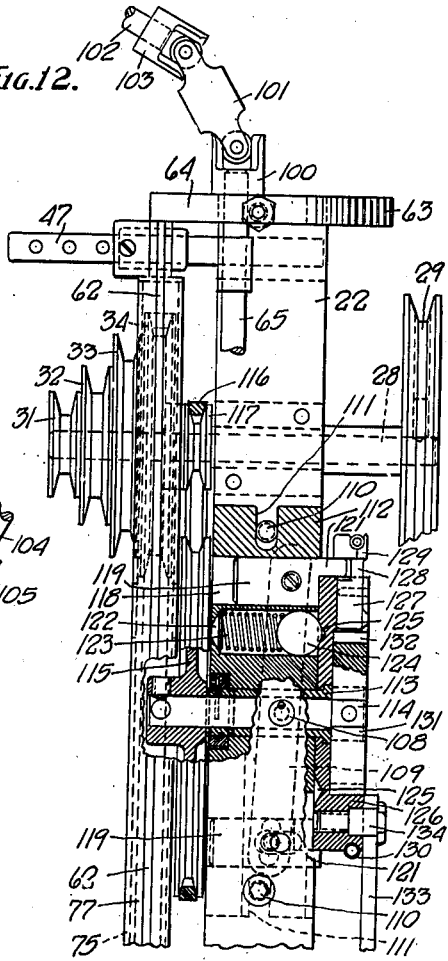
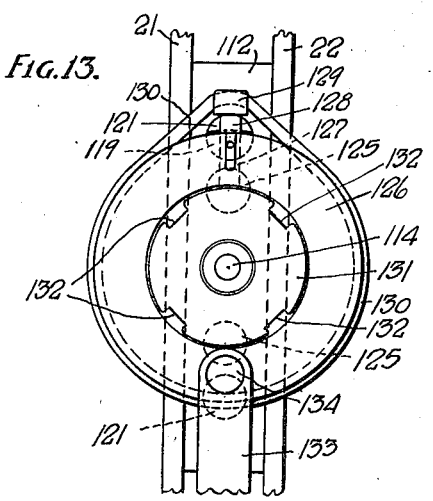
INVENTOR.
GEORGE L. GARVIN.
BY Altech & Knoblock
ATTORNEYS.

Patented Nov. 18, 1941

2,263,438

UNITED STATES PATENT OFFICE 2,263,438

BELT SHIFTER

George L. Garvin, South Bend, Ind., assignor to South Bend Lathe Works, South Bend, Ind., a corporation of Indiana Application June 28, 1940, Serial No. 342,862

9 Claims. (Cl. 74—242)

This invention relates to belt shifters, and more particularly to devices for shifting V-belts from one to another position on step pulleys for speed changing purposes.

Various devices have been perfected heretofore by means of which flat belts may be shifted from one to another position on flat stepped pulleys. However, there has not been developed up to this time any satisfactory device by means of which V-belts may be shifted on stepped V-pulleys. One of the obvious difficulties encountered in attempting to shift V-belts has been the fact that the pulleys therefor are flanged, and that the driving force is effected by engagement between the sides of the V-belt and the inner faces of the pulley flanges, with the belt seating within the V-pulley in a manner to prevent lateral displacement thereof. Hence when one of the respective step pulleys is shifted toward the other to loosen the V-belt, the movement must be of substantial amplitude for the belt to clear the pulley flanges and to ride over the flanges of both of the pulleys to which the belt is to be changed. This means that the belt is shifted bodily with respect to both pulleys, so that some external means is necessary to confine it and maintain it in position to be reset. Also, a V-belt will normally take a circular position, so reducing the spacing between centers of pulleys normally results merely in outward bowing of the belt between the pulleys with at least a portion thereof remaining in the grooves of the V-pulleys.

It is the primary object of this invention to provide means for overcoming these difficulties and solving the problem of shifting a V-belt in a controlled manner from one step of a step pulley to any other selected step of said pulley.

A further object of this invention is to provide a device of this character having means for shifting one of a pair of step pulleys, together with means for enveloping and confining the V-belt in accurate desired position released from and clear of the opposed step pulleys.

A further object is to provide a belt shifter having means for releasing a belt from a pair of complementary step pulleys, means for holding the belt in controlled position clear of said pulleys, and means for shifting said last named means to a position in register with selected complementary steps of said pulleys preparatory to operation of said first named means to return said belt to operative relation to said pulleys.

A further object is to provide a device of this character having a stationary and a shiftable step pulley, with a belt retaining envelope comprising a pair of normally spaced parts, said envelope including one portion which is shiftable with the shiftable step pulley to a position adjacent to the other part of the envelope for closing said envelope.

A further object is to provide a device of this character with a normally open multi-part belt retaining envelope having one part shiftable with a shiftable step pulley between open and closed positions, said envelope having an interior perimetral dimension when closed which is substantially equal to the outer peripheral dimension of a belt, whereby, when said envelope is closed, a V-belt will be confined in said envelope clear of said step pulleys by virtue of the natural tendency of a V-belt to assume a circular shape when released from tension.

A further object is to provide a novel, simple, and comparatively inexpensive device of this character which is positive and trouble-free in operation.

A further object is to provide a device of this character which is adapted for operation and control from a control station remote therefrom.

Other objects will be apparent from the description and appended claims.

In the drawings:

Fig. 7 is a transverse horizontal sectional view of the device taken on line 7—7 of Fig. 1.

Fig. 8 is a transverse horizontal sectional view of the device taken on line 8—8 of Fig. 1.

Fig. 9 is a sectional view similar to Fig. 8, but illustrating the application of the device to the use of double V-belts.

Fig. 10 is an enlarged detail sectional view taken on line 10—10 of Fig. 2.

Fig. 11 is a fragmentary front elevational view of the device provided with control means operable from a remote point.

Fig. 12 is a fragmentary view of the device with remote control means taken in side elevation, and with parts broken away.

Fig. 13 is a fragmentary rear elevation of a portion of the device including the remote control mechanism.

Figure 1:
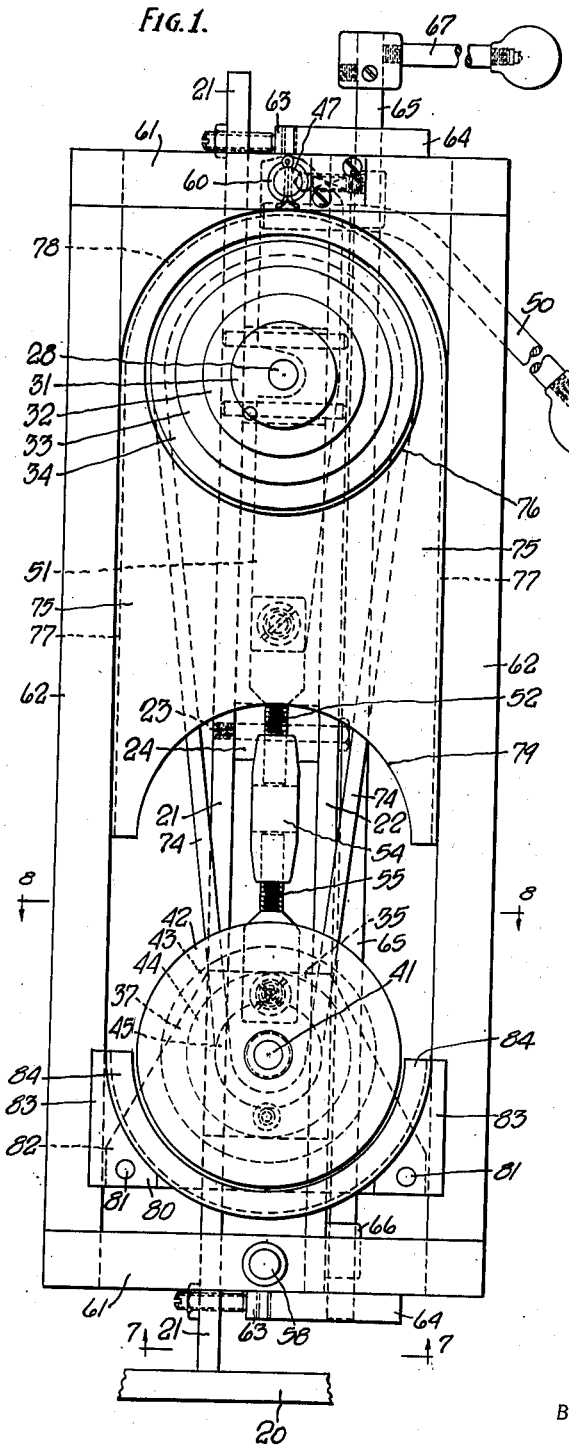
Fig. 1 is a view of the device in front elevation.

Referring to the drawings which illustrate the preferred embodiment of the invention, the numeral 20 designates a suitable base upon which the device is adapted to be supported. Mounted upon this base 20 is an upright guide member 21. A second upright guide member 22 extends parallel to guide member 21 in spaced relation thereto and is secured thereto by bolts 23 extending through spacers 24 positioned between said guide members in spaced relation along the height of said guide members 21 and 22. The guide members are preferably elongated flat bars of substantial width. As best illustrated in Fig. 1, the guide member 21 extends above the height of the guide member 22.

At a position between the upper ends of the guide members a suitable bearing 25, constituting a spacer for said guide members, is secured to said guide members by securing members 26. Bearing 25 has a sleeve 27 projecting therefrom and journals a horizontal shaft 28 passing centrally between the guide members 21 and 22. The rear end of shaft 28 mounts a suitable V-pulley 29 for a V-belt 30 which extends to the drive means for the device. Upon the opposite end of the shaft 28 is mounted a step pulley comprising a plurality of V-pulleys 31, 32, 33 and 34, of progressively increasing size from outer to inner end, with the inner face of the innermost pulley 34 spaced slightly forwardly from the front vertical edges of the guides 21 and 22.

In spaced relation below the bearing 25, a bearing 35 is slidably mounted between the guides 21 and 22. Bearing 35 is retained against lateral movement on the guide members by means of end plates 36 and 37. Bearing 35 mounts a sleeve 38 which projects rearwardly therefrom and journals a shaft 41 which mounts a pulley 39 over which is adapted to run an upwardly directed belt 40 extending to the work to be driven by the device. The forward end of shaft 41 mounts a series of V-pulleys 42, 43, 44 and 45, whose flanges are aligned with the flanges of pulleys 31 to 34 respectively. Pulleys 42—45 are of decreasing size from outer to inner end, with the difference in the size thereof being complementary to the difference in the size of the pulleys 31—34.

A spacer member 46 connects the upper ends of the guides 21, 22, and a horizontal guide pin 47 is fixedly carried by spacer 46 and projects therefrom at its ends. The guide pin 47 has a plurality of recesses 48 formed in equi-spaced relation along its length at its forwardly projecting end for purposes to be hereinafter set forth. A sleeve 49 is rotatably mounted upon the rear end of pin 47 and has fixedly connected thereto an operating arm 50. A link 51 is also fixedly connected with the sleeve 49 and with lever 50, and extends downwardly therefrom. Link 51 is provided with a cut-out 51' adapted to fit freely around the shaft 28. At its lower end the link 51 is pivotally connected with a screw threaded member 52 by means of bolt 53. A turn buckle 54 is threaded on the lower end of member 52, and a second threaded member 55 is threaded in the opposite end of the turn buckle and is pivotally connected with the end plate 36 of the bearing 35 by bolt 56.

It will be seen that the link 51 constitutes one part, and members 52 and 55 constitute the other part of a toggle member whose center pivot is member 53. Hence, when the lever 50 is lifted upwardly from the position illustrated in Fig. 1 to the position illustrated in Fig. 3, the link 51 will be pivoted about the pin 47 to an angular position with respect to the vertical which raises and pivots the other toggle part 52—55 to raise the bearing block 35 guided by the guides 21, 22. In this way the pulley 39 and the step pulley 42—45 are both raised to release the respective belts trained thereover.

A block 57 is rigidly secured between the guides 21, 22 at the lower end thereof and rigidly mounts a second guide pin 58 parallel to the pin 47. A sleeve 59 is slidably mounted on pin 58, and a sleeve 60 is slidably mounted upon pin 47. These sleeves 59, 60 have rigidly connected thereto a rigid rectangular frame member comprising horizontal upper and lower horizontal bars 61 and a pair of spaced vertical bars 62. Racks 63 are rigidly carried by the upper and lower ends of the frame 61—62 to extend parallel to the pins 47—58. These racks mesh with gear segments 64 fixedly mounted on a vertical shaft 65 which is journaled in bearings 66 carried by guide 22. At the upper end thereof the shaft 65 mounts a suitable operating lever 67.

Hence it will be seen that when the lever 67 is operated, the shaft 65 rotates to rotate the gears 64 and longitudinally shift the racks 63 for movement of the frame 61—62 upon the guide pins 47—58. As best illustrated in Fig. 10, the upper frame member 61 carries a block 68 adjacent pin 47 having a bore 69 therein extending transversely of pin 47. Bore 69 receives a coil spring 70 whose outer end bears upon a set screw 71 threaded in block 68. The opposite end of the bore 69 terminates adjacent the sleeve 60, which has a passage 72 therein registering with bore 69 for reception of a ball 73 pressed upon by spring 70. The ball 73 normally seats within one of the recesses 48 of the pin 47 for the purpose of accurately positioning the frame 61—62.

A V-belt 74 is normally trained about complementary steps of the step pulleys 31, 34, 42—45, and the portion thereof adjacent the upper step pulley 31—34 passes through a part of a retainer or envelope fixedly carried by the upper part of the frame 61—62. This envelope portion comprises front and back walls 75 which have openings 76 therethrough concentric with the shaft 28 and of a diameter slightly larger than the diameter of the largest pulley 34 of the upper step pulley. The envelope portion also has end walls 77 of a width such that the inner faces of the walls 75 are spaced apart a distance slightly greater than the maximum transverse dimension of the belt 74. The side walls 77 of the envelope merge in a rounded portion 78 concentric with shaft 28 at the upper end of the envelope. The lower ends of the front and back plates 75 of the envelope portion are provided with semi-circular recessed edges 79 of the same diameter as the openings 76.

A lower envelope portion 80 is slidably mounted upon studs 81 parallel to studs 47—58. Shafts 81 are carried by the lower enlarged end portion 82 of end plate 37 of bearing 35. The envelope portion 80 is provided with vertical guide flanges 83 seating on the inner vertical edges of the upright frame members 62 for sliding movement thereon. The guide member 80 has a channel shaped portion 84 of the same width as the upper portion of the envelope, and is of semi-circular form concentric with shaft 41. The inner diameter of channel portion 84 is slightly larger than the diameter of the largest pulley 42 of the lower step pulley 42—45.

Figure 2:
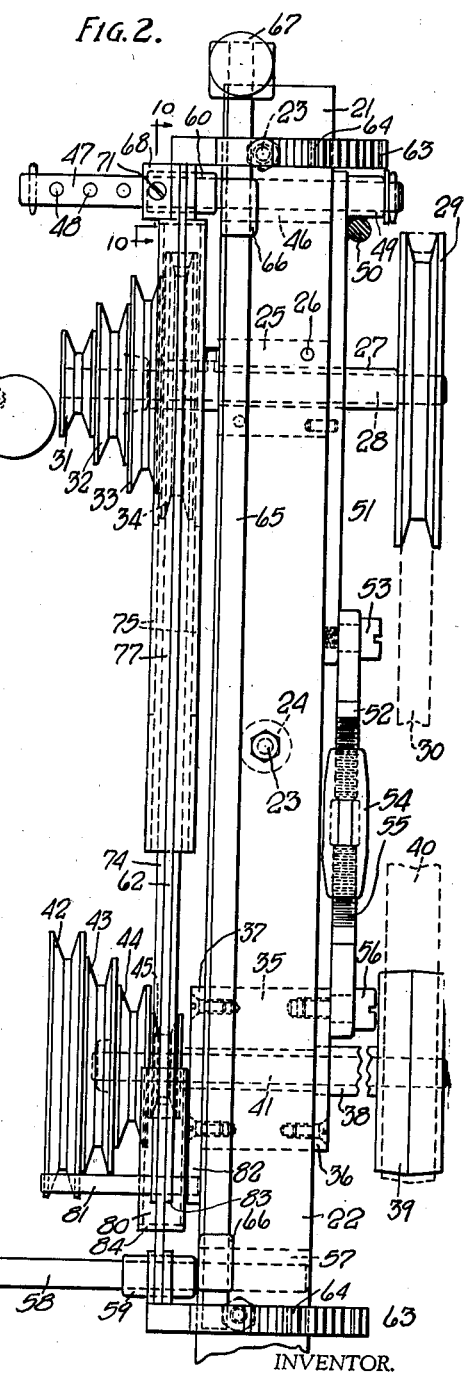
Fig. 2 is a view of the device in side elevation.

The operation of the device is as follows: Figs. 1 and 2 illustrate the operative driving position of the device, with the drive belt 74 seated in and tensioned on complementary steps of the two step pulleys to impart driving rotation from the drive shaft 23 to the driven shaft 41. Assuming that it is desired to shift the belt from one to another position on said step pulleys for the purpose of changing the speed of the driven shaft 41, the lever 50 is first raised to the position illustrated in Figs. 3 and 4. In this position, the toggle 51, 52, 55 has been pivoted to raise the bearing 35 journaling the shaft 41. At the same time the lower envelope portion 80 and the studs 81, both carried by bearing 35, are also raised an equal amount. The parts are so proportioned and arranged that when the lever 50 reaches the upper limit of its movement, the upper edge of the lower envelope portion 80 will be brought substantially into engagement with the lower edge of the envelope 75, 77 to close said sectional envelope. Also, it will be observed that in this closed envelope position the semi-circular edge portions 79—84 of the upper and lower envelope portions, respectively, are positioned in substantially circular relation as best illustrated in Fig. 3.

By virtue of the cross sectional configuration of a V-belt, the same has a tendency to assume circular shape when released from tension. Hence, as the tension on the belt 74 is released by the raising of the shaft 41 and associated parts, the belt 74 will first tend to expand laterally and into engagement with the sides 77 of the stationary portion of the envelope, and thereafter as the vertical upward movement of the shaft 41 and associated parts is continued, the belt will tend to assume the shape of the closing envelope until it bears completely against the envelope at walls 77, 78 and 84 thereof throughout its entire outer periphery when the envelope is fully closed. For this purpose it will be understood that the amount of movement of the shaft 41 will be carefully calculated relative to the size of the envelope parts, so that the inner circumference of the complete envelope at its closed position will substantially conform with the dimension of the exterior perimeter of the belt 74.

Figure 3:
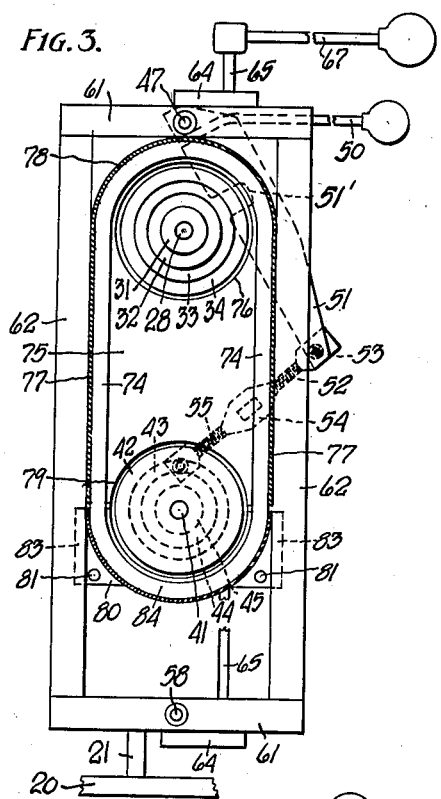
Fig. 3 is a view of the device in front elevation in belt releasing position with parts shown in section.
Figure 4:
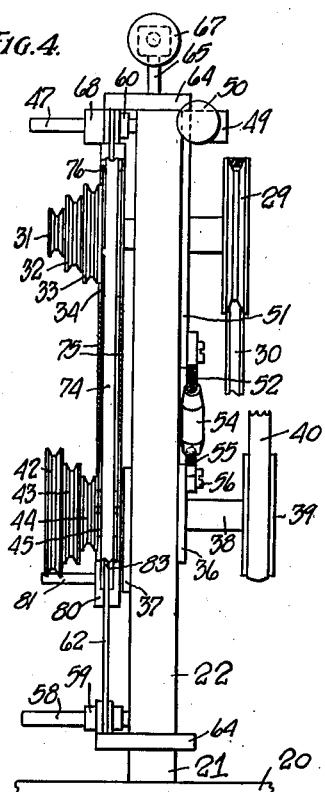
Fig. 4 is a side elevation of the device in belt releasing position with parts broken away.

Hence, when the shaft 41 has been raised to uppermost position as illustrated in Fig. 3, the belt 74 thereof will be fully confined within the closed envelope and will be prevented from lateral movement with respect to the step pulleys 34, 45 from which it has just been released, as illustrated in Fig. 2 and Fig. 4. The elongation of the upper part of the envelope at the walls 75 obviously prevents the lateral displacement of the belt 74 during the interval between initial belt releasing movement and complete closing of the envelope, at which time the belt assumes the position illustrated in Fig. 3.

Figure 5:
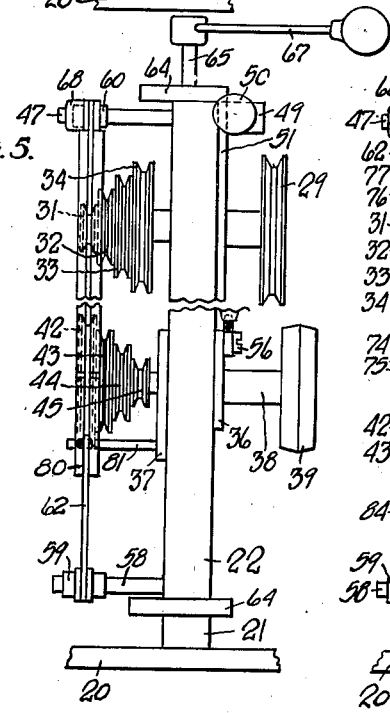
Fig. 5 is a fragmentary side elevation of the device illustrating the belt shifter in another position.

It will be observed from Fig. 3 that the dimension of the parts is such that the inner circumference of the belt 74 at the upper and lower bends thereof is greater than the circumference of the largest step pulleys 34 and 42 of the upper and lower step pulleys. Hence the belt is confined in a position whereby the lever 67 may be swung to any desired position. As illustrated in Fig. 5, this lever may be swung to shift the envelope upon the pins 47—58 to outermost position in register with the outermost pulleys 34—42 of the two step pulleys. For the purpose of assuring accuracy of positioning, it will be observed that, as the frame 62 and the envelope carried thereby are shifted, by operation of the lever 67, the ball 73 will seat successively in the recesses 48 of the pin 47, and by this means the operator is enabled to tell when he has reached the precise position desired for the particular belt setting which he is selecting.

Figure 6:
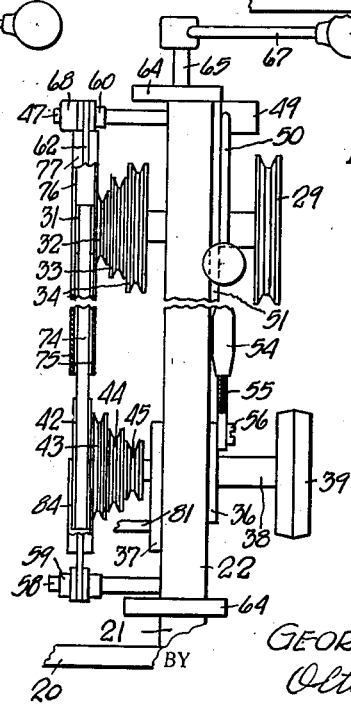
Fig. 6 is a side elevation of the device with parts shown in section illustrating the belt in changed driving relation to the pulleys.

Therefore, when the ball 73 seats in the desired recess 48, movement of the lever 67 is stopped and thereupon the lever 50 is shifted downwardly to expand the toggle 51, 52, 55 to the position illustrated in Figs. 1 and 6, thereby lowering the shaft 41 to a point where the belt is tensioned upon the pulleys 31—42 and is in position for driving said pulley and the shaft 41.

From the above it will be seen that the device is simple in its operation since it requires only the manipulation of two levers 50 and 67 in proper sequence. The loosened belt 74 is fully confined and prevented from displacement from alignment with the pulleys from which it has just been released. The desired setting of the envelope may be quickly and accurately made guided by the impulses imparted by the seating of the spring pressed ball 73 in recesses 48 when the envelope has reached a position in register with any one of the steps of the step pulley.

The device is not limited to the utilization of a single pulley but may, as illustrated in Fig. 9, be used for application to constructions where multiple belts 74 are required for the transmission of a greater amount of power than a single belt can transmit. For this purpose the envelope is constructed as above illustrated, with the exception that it is of a width to receive two belts side by side therein, and is provided at the center of its interior with a guide ridge 90, for properly spacing said belts to permit their automatic re-seating upon the double pulleys 91 or 92 after the envelope has been shifted into register therewith.

In the event it is desired to control the operation of the mechanism as described above from a remote point, mechanism for that purpose, as best illustrated in Figs. 11 to 13 inclusive, may be employed. The shaft 65 has mounted on its upper end a socket 100 which is connected by a suitable link 101 with a shaft 102 extending to the remote control station, said shaft 102 having a socket 103 of a construction complementary to socket 100. The parts 100, 101 and 103 are pivotally interconnected to constitute a universal joint, whereby rotation of the shaft 102 at the control station will equally rotate the shaft 65. A shaft 104 may also extend from the control station, and mounts at its end a socket 105 connected with a link 106 in turn connected with a socket 107 for the purpose of controlling means for raising and lowering the pulley shaft 41. Sockets 105, 106 and 107 are pivotally interconnected to constitute a universal joint for transmitting to a shaft 108 mounting socket 107 the rotation imparted to the control shaft 104. Shaft 108 is journaled in the guide 22 and mounts thereon a lever 109.

A pair of vertically spaced bolts 110 extend centrally between the guides 21 and 22 below the bearing 25, and seat in vertical notches 111 of a block 112 positioned between the guides 21 and 22. A bearing 113 is mounted in the block 112 and journals a shaft 114 parallel to shaft 23 and positioned therebelow. At the front end of the shaft 114 is mounted a V-pulley 115 adapted to be driven by a belt 116 which also runs over a pulley 117 mounted upon the shaft 28 between the front edge of the frame parts 21, 22 and the adjacent step pulley 31—34. Hence it will be observed that the shaft 114 is constantly rotating.

Adjacent the upper and lower ends of the block 112 are provided guide passages 118 in which pins 119 are slidable. Pins 119 are pivotally connected at 120 with the ends of the lever 109. Each of these pins 119 has a projection 121 in the nature of a cam projecting from its outer end. The lever 109 swings between limits which normally positions one of the pins 119 retracted and the other pin 119 extended, as best illustrated in Fig. 12 where the lower pin is retracted and the upper pin is extended. It will be understood that the position of the lever will be shifted to reverse the parts which are retracted and extended by rotating shaft 108. Spaced downwardly from the upper pin 119 is a recess 122 receiving a spring 123 which presses outwardly upon a ball 124. A fly wheel 126 is journaled upon the bearing 113 at the rear thereof and has a pair of diametrically opposed recesses 125 formed in its inner face. Ball 124 is normally spring pressed into one of the recesses 125. At one point in its periphery, preferably radially aligned with recesses 125, the fly wheel 126 is provided with a radial socket in which is slidably mounted a pin 127. Pin 127 has a reduced neck portion 128 and a head 129. An endless coil spring 130 seats in a notch in head 129 and in a groove formed in the fly wheel, and serves to provide means for normally urging the pin 127 radially inwardly. As illustrated in Fig. 12, the cam projection 121 of one of the pins 119 is normally seated under the head 129 to hold the pin 127 in its outermost position. The outer face of fly wheel 126 is concentrically recessed, and the inner end of pin 127 extends to said recess when the projection 121 seats under the head 129 of said pin 127.

Fixedly mounted upon the shaft 114 within the recess formed in the outer face of the fly wheel 126 is a rotating disk 131 which has a plurality of notches 132 positioned in equi-spaced relation therearound.

A link 133 is pivoted by a pin 134 to the fly wheel 126, and at its lower end is pivoted at 135 to the lower bearing 35 which mounts shaft 41.

The parts are illustrated in Fig. 12 in their normal or rest position with the bearing 35 positioned at its belt tensioning or lowermost position. If it is desired to release the belt tension, the shaft 104 is rotated to thereby rotate shaft 108. The rotation of shaft 108 pivots lever 109 from the position illustrated in Fig. 12 to the opposite position thereof to retract the uppermost pin 119 and to extend the lowermost pin 119. The retraction of the uppermost pin 119 permits the spring 130 to urge the pin 127 inwardly against the periphery of disk 131, so that it may seat in the first notch of the constantly rotating disk 132 which registers therewith. The seating of pin 127 in said notch provides a driving connection between the constantly rotating disk 131 and the fly wheel 126. The subsequent rotation of the fly wheel 126 serves to shift the link 133 to raise the upper end thereof to a belt releasing position as will be understood. As the disk approaches belt releasing position, which is displaced 180 degrees from its initial position, the cam projection 121 of the lowermost pin 119 seats under the head 129 to urge the pin 127 radially outwardly for release thereof from notch 132. This occurs slightly before the lowermost recess 125 in the fly wheel comes opposite the spring pressed ball 124, so that when a full half revolution of the fly wheel has occurred, the ball 124 will press into the adjacent fly wheel recess 125 to stop the fly wheel at a position exactly 180 degrees from the starting position. In this way it will be observed that the belt tension upon drive belt 74 may be released by operation of a control extending to a point remote from the device.

Thereupon the shaft 102 may be rotated to shift the envelope for belt 74 to desired position relative to the step pulleys, and then the shaft 104 at the control station may be again rotated to return the lever 109 to the position illustrated in Fig. 12. Thereupon the lowermost pin 119 is retracted to permit the pin 127 to seat in a notch 132 in constantly rotating disk 131 for effecting driving connection between the fly wheel 126 and said disk 131, which rotation is limited to 180 degrees to position the parts as illustrated in Fig. 12, by virtue of the release of pin 127 by the cam projection 121 of the upper pin 119 as will be obvious. This constitutes a simple and effective means for controlling the belt shifter from a remote station, and has the advantage of simplicity, inexpensive construction, and positive mechanical operation.

I claim:

1. The combination with a support mounting a pair of complementary flanged step pulleys interconnected by a V-belt, wherein at least one of said pulleys is shiftable on said support between belt tensioning and belt releasing positions, of means for shifting said belt between selected steps of said pulleys comprising a guide on said support parallel to the axes of said pulleys, a frame shiftable on said guide and arranged parallel to the plane of said belt, and a two part belt confining member carried by said frame, one part of said confining member being fixed on said frame and the other part being slidable on said frame and means connecting said shiftable confining member with said shiftable pulley, the parts of said confining member being positioned adjacent each other in belt releasing position to constitute a unit in which said belt nests clear of said pulleys to accommodate shifting of said frame and confining member to any selected position relative to said pulleys and guide.

2. A belt shifter comprising a support, a pair of spaced complementary flanged step pulleys, means fixed on said support and journaling one pulley, a carrier shiftable on said support for journaling the other pulley, a V-belt connecting said pulleys, a belt retainer juxtaposed to said first pulley and shiftable on said support in a path parallel to the pivot axes of said pulleys, a second belt retainer normally spaced from said first retainer and shiftably mounted on said carrier in a path parallel to the pivot axes of said pulleys, and means for equally shifting both retainers, at least one of said retainers being elongated to extend adjacent to the other retainer when said retainers and pulleys are disposed in belt releasing position, said elongated retainer having openings in its sides concentric with and larger than the largest step of the stationary pulley, and the adjacent ends of said retainers having complementary concave edges to form openings therebetween concentric with and larger than the largest step of the shiftable pulley.

3. The combination with a support, a driving shaft journaled in said support, a step pulley on said shaft, of a carrier shiftable on said support, a driven shaft journaled in said carrier, a step pulley on said driven shaft, a belt trained over said pulleys, a belt retainer juxtaposed to said driving pulley and shiftable on said support in a path parallel to the pulley axes, a second belt retainer normally spaced from said first retainer and juxtaposed to said driven pulley, said second retainer being shiftable on said carrier in a path parallel to the pulley axes, and selectively actuatable means driven by said driving shaft for shifting said carrier to belt releasing position with said second retainer juxtaposed to said first retainer.

4. The combination with a support, a driving shaft journaled in said support, a pulley on said shaft, of a driven shaft, a bearing shiftable on said support toward and from said first pulley and journaling said driven shaft, a pulley on said driven shaft, a belt trained over said pulleys, and selectively actuatable means on said support driven by said driving shaft for shifting said bearing.

5. The combination defined in claim 4, wherein said selectively actuable means comprises a rotating member driven by said driving shaft, a normally stationary member journaled concentric with rotating member, a link pivoted to said last named member and to said bearing, and normally released clutch means carried by said normally stationary member and engageable with said rotating member.

6. The combination with a support, a driving shaft journaled in said support, a pulley on said shaft, of a carrier shiftable on said support, a driven shaft journaled in said carrier, a pulley on said driven shaft, a belt trained over said pulleys, a normally rotating member journaled in said support and having a driving connection with said driving shaft, a normally stationary rotatable member journaled on said support adjacent and concentric with said normally rotating member, a link pivoted to said last named member and to said carrier, means for effecting a driving connection between said rotating and rotatable members, and means carried by said support for disengaging said driving means upon predetermined rotation of said normally stationary rotatable member.

7. The combination defined in claim 6, and means for stopping rotation of said normally stationary member in predetermined position after operation of said disengaging means.

8. The combination defined in claim 6, wherein said normally stationary member is recessed and said rotating member is notched and fits in said recess, and said connecting means between said members comprises a spring pressed pin slidable radially in said normally stationary member and having a head at its outer end, and a selectively positioned cam slidable in said support and normally seating under said head.

9. The combination defined in claim 6, wherein said drive connection between said rotating and rotatable members is effected by a spring pressed pin carried by said rotatable member, a pair of cams slidably carried by said support in diametrically opposed relation to said rotatable member, one of said cams being normally projected in the path of said pin and the other being retracted, and means carried by said supports for shifting said cams to reversed positions to release said pin from one cam for engagement with said rotating member while the rotatable member rotates a half revolution to effect engagement of said pin with the other cam.

GEORGE L. GARVIN.